US009780380B2

(12) United States Patent
Chae et al.

(10) Patent No.: US 9,780,380 B2
(45) Date of Patent: *Oct. 3, 2017

(54) CURRENT COLLECTOR FOR BATTERY AND SECONDARY BATTERY COMPRISING THE SAME

(71) Applicant: SK INNOVATION CO., LTD., Seoul (KR)

(72) Inventors: Je Hyun Chae, Daejeon (KR); Jeong Soo Kim, Daejeon (KR); Won Sang Koh, Daejeon (KR); Seung Ok Lee, Daejeon (KR); Young Shol Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,410

(22) Filed: Mar. 25, 2014

(65) Prior Publication Data
US 2014/0295238 A1    Oct. 2, 2014

(30) Foreign Application Priority Data
Mar. 26, 2013    (KR) .................. 10-2013-0031911

(51) Int. Cl.
*H01M 4/66* (2006.01)
*H01M 10/054* (2010.01)
*H01M 4/78* (2006.01)
*H01M 4/62* (2006.01)

(52) U.S. Cl.
CPC .......... *H01M 4/667* (2013.01); *H01M 4/668* (2013.01); *H01M 4/78* (2013.01); *H01M 10/054* (2013.01); *H01M 4/62* (2013.01)

(58) Field of Classification Search
None
See application file for complete search history.

(56) References Cited

U.S. PATENT DOCUMENTS

| 4,054,728 | A | * | 10/1977 | Broadhead | ........ H01M 10/3909 429/104 |
| 4,069,372 | A | * | 1/1978 | Voinov | .................. H01M 10/39 429/104 |
| 5,750,289 | A | * | 5/1998 | Kejha | .................... H01M 4/382 429/233 |
| 2003/0054255 | A1 | | 3/2003 | Hidaka et al. | |
| 2010/0279165 | A1 | * | 11/2010 | Lemmon | ................. H01M 4/38 429/102 |
| 2010/0297537 | A1 | | 11/2010 | Coors et al. | |

(Continued)

FOREIGN PATENT DOCUMENTS

CN    1305235    7/2001
CN    202651299    1/2013

*Primary Examiner* — Patrick Ryan
*Assistant Examiner* — Carmen Lyles-Irving
(74) *Attorney, Agent, or Firm* — IP & T Group LLP

(57) ABSTRACT

Provided is a current collector including a laminate in which a conductive substrate and an insulator are laminated, wherein the insulator is a porous insulator formed with an open pore channel penetrating through the insulator. The current collector may be used as a current collector for an electrode of a secondary battery and stably maintain capacity of the secondary battery at the time of repeating charge and discharge cycles.

12 Claims, 5 Drawing Sheets

(56) References Cited

U.S. PATENT DOCUMENTS

| | | | | |
|---|---|---|---|---|
| 2012/0251854 A1* | 10/2012 | Kusama | .............. | H01M 2/1229 |
| | | | | 429/62 |
| 2013/0052525 A1* | 2/2013 | Kageura | ............... | H01M 4/133 |
| | | | | 429/200 |
| 2013/0323603 A1* | 12/2013 | Ryu | ...................... | H01M 4/382 |
| | | | | 429/320 |
| 2014/0212755 A1* | 7/2014 | Wu | ....................... | H01M 4/131 |
| | | | | 429/221 |

* cited by examiner

CURRENT COLLECTOR FOR BATTERY AND SECONDARY BATTERY COMPRISING THE SAME

CROSS-REFERENCE TO RELATED APPLICATIONS

This application claims priority under 35 U.S.C. §119 to Korean Patent Application No. 10-2013-0031911, filed on Mar. 26, 2013, in the Korean Intellectual Property Office, the disclosure of which is incorporated herein by reference in its entirety.

TECHNICAL FIELD

The following disclosure relates to a current collector for a secondary battery and a secondary battery comprising the same, and more particularly, to a current collector capable of preventing capacity of a battery from being reduced at the time of repeating charge and discharge cycles, and a secondary battery comprising the same.

BACKGROUND

In accordance with a rapid increase in the use of renewable energy, the necessity for an energy storage device using a battery has rapidly increased. Among these batteries, a lead battery, a nickel/hydrogen battery, a vanadium battery, and a lithium battery may be used. However, since the lead battery and the nickel/hydrogen battery have significantly low energy density, they require a large space in order to store the same capacity of energy therein. Further, in the case of the vanadium battery, the vanadium battery uses a solution containing a heavy metal, which causes environmental contamination, and a small amount of materials may move between an anode and a cathode through a membrane separating the anode and the cathode from each other, which deteriorates performance. Therefore, the vanadium battery may not be commercialized on a large scale. The lithium battery having significantly excellent energy density and output characteristics is significantly advantageous in view of a technology. However, the lithium battery is disadvantageous in view of economic efficiency in being used as a secondary battery for large scale power storage due to scarcity of a lithium material.

In order to solve this problem, many attempts to use a sodium resource sufficiently present on the Earth as a material of the secondary battery have been conducted. Among them, as disclosed in US Patent Laid-Open Publication No. 20030054255, a sodium-sulfur battery having a form in which a beta alumina having selective conductivity for a sodium ion is used, an anode contains sodium, and a cathode contains sulfur has been currently used as a large scale power storage.

However, in the existing sodium based secondary battery such as the sodium-sulfur battery or a sodium-nickel chloride battery, conductivity thereof and melting points of battery compositions should be considered. For example, the sodium-nickel chloride battery has an operation temperature of at least 250° C. or more, and the sodium-sulfur battery has an operation temperature of at least 300° C. or more. Due to this problem, there are many disadvantages in economical efficiency of manufacturing or operating the sodium based secondary battery while maintaining a temperature and sealability of the battery and reinforcing the safety thereof. In order to solve the above-mentioned problem, a room-temperature sodium based battery has been developed, but the output thereof is significantly low, such that the room-temperature sodium based battery has significantly low competitiveness as compared with the nickel-hydrogen battery or the lithium battery.

RELATED ART DOCUMENT

Patent Document

US Patent Laid-Open Publication No. 20030054255

SUMMARY

An embodiment of the present invention is directed to providing a current collector for a secondary battery capable of preventing capacity of a secondary battery from being reduced at the time of repeating charge and discharge cycles and provide a sodium secondary battery capable of operating at a low temperature, having significantly improved output and charge and discharge rate of the battery, stably maintaining charge and discharge cycle characteristics of the battery for a long period time, preventing degradation so as to have an improved battery lifespan, and improving stability of the battery.

In one general aspect, a current collector for a secondary battery includes a laminate in which a conductive substrate and an insulator are laminated, wherein the insulator is a porous insulator including an open pore channel penetrating through the insulator.

A surface area of a surface of the conductive substrate exposed by the open pore channel may satisfy the following Correlation Equation 1.

$$0.05 A_s \leq A_p \leq 0.8 A_s \qquad \text{(Correlation Equation 1)}$$

Where, $A_s$ is a surface area of one face of the conductive substrate on which the insulator is laminated, and $A_p$ is the surface area of the surface of the conductive substrate exposed by the open pore channel.

The insulator may be formed with a pore channel array in which a plurality of open pore channels are arrayed to be spaced apart from each other.

A cross-sectional area of the open pore channel may be 0.01 mm$^2$ to 80 mm$^2$.

The conductive substrate may have a plate shape, and the insulator may be laminated on one face of the plate shaped conductive substrate.

The insulator may have a hollow cylindrical shape, and the conductive substrate may enclose an outer surface or an inner surface of the cylindrical insulator.

The insulator may be a polymer.

In another general aspect, a secondary battery includes the current collector as described above.

In another general aspect, a sodium secondary battery includes: an anode containing sodium; a cathode immersed into a cathode solution and including the current collector as described above as a cathode current collector; and a sodium ion conductive solid electrolyte separating the anode and the cathode solution from each other.

The cathode solution may contain a metal halide, which is a halide of at least one metal selected from transition metals and Groups 12 to 14 metals; and a solvent dissolving the metal halide.

At the time of discharging the secondary battery, a metal ion of the metal halide contained in the cathode solution may be electroplated on the cathode current collector as a metal, and at the time of charging the secondary battery, the metal electroplated on the cathode current collector may be dissolved in the cathode solution as the metal ion.

The cathode solution may further contain at least one plating additive selected from a suppressor, a leveler, and an accelerator.

The accelerator may be a sulfur-containing organic compound, the suppressor may be an oxygen-containing polymer compound having a weight average molecular weight (Mw) of 1000 to 20000 g/mol, and the leveler may be a nitrogen-containing organic material.

DETAILED DESCRIPTION OF MAIN ELEMENTS

Figure 1:
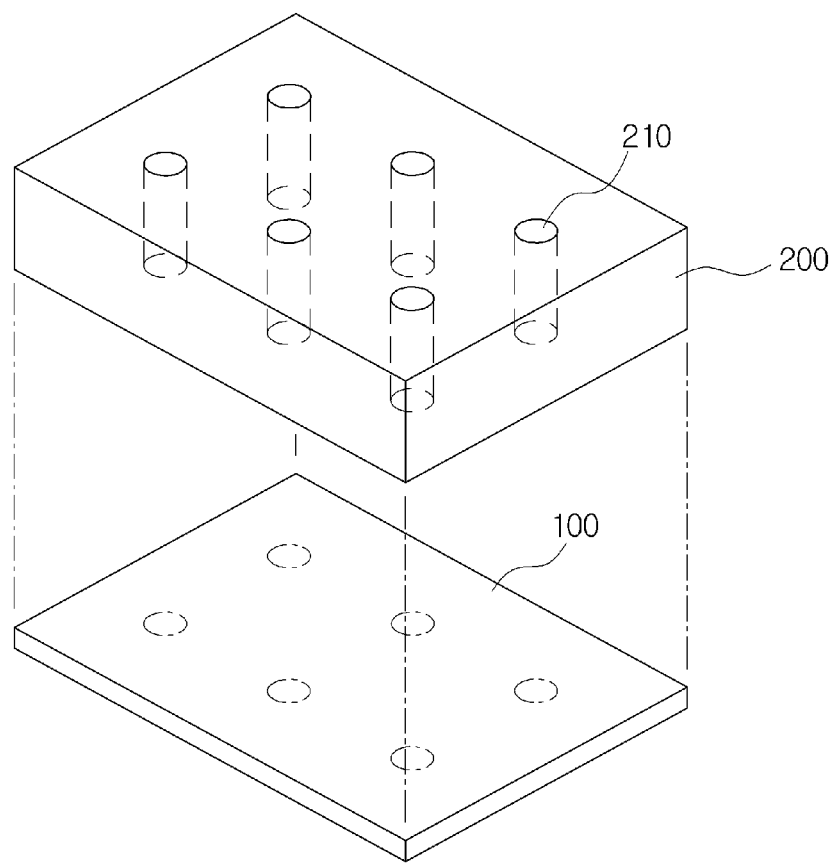
FIG. 1 is a perspective view of a current collector according to an exemplary embodiment of the present invention.

| 100: conductive substrate | 200: insulator |
| 210: open pore channel | 300: metal housing |
| 400: solid electrolyte tube collector | 510: cathode current |
| 520: cathode solution | 600: anode |
| 610: safety tube | 620: wicking tube |

DETAILED DESCRIPTION OF EMBODIMENTS

Hereinafter, a current collector according to the present invention and a secondary battery comprising the same will be described in detail with reference to the accompanying drawings. The drawings to be provided below are provided by way of example so that the idea of the present invention can be sufficiently transported to those skilled in the art. Therefore, the present invention is not limited to the drawings to be provided below, but may be modified in many different forms. In addition, the drawings to be provided below may be exaggerated in order to clarify the scope of the present invention. Further, like reference numerals denote like elements throughout the specification.

Here, technical terms and scientific terms used in the present specification have the general meaning understood by those skilled in the art to which the present invention pertains unless otherwise defined, and a description for the known function and configuration obscuring the present invention will be omitted in the following description and the accompanying drawings.

The current collector according to the present invention is a current collector for a secondary battery and includes a laminate in which conductive substrate and an insulator are laminated. The insulator included in the laminate is a porous insulator formed with an open pore channel penetrating through the insulator. In detail, the insulator may be the porous insulator formed with the open pore channel penetrating the insulator in a direction in which the conductive substrate and the insulator are laminated.

In the current collector according to the exemplary embodiment of the present invention, a predetermined region of one face of the conductive substrate on which the insulator is laminated may be exposed to a surface by the open pore channel formed in the insulator. In this case, the surface may mean a face physically contacting with an external fluid including gas and/or a liquid. In more detail, the surface may be a face contacting with air in the laminate or a face contacting with a liquid medium configuring a battery when the current collector is provided in the battery.

The current collector according to the exemplary embodiment of the present invention only serves to collect or supply charges (electrons) and allow the battery to be electrically connected to the outside but does not include a general battery active material (cathode active material or anode active material).

In the current collector according to the exemplary embodiment of the present invention, specific resistance of the conductive substrate at 295K may be $10^{-9}$ to $10^{-3}$ $\Omega m$, specifically, $10^{-9}$ to $10^{-4}$ $\Omega m$, and more specifically, $10^{-9}$ to $10^{-6}$ $\Omega m$. As a non-restrictive example, the conductive substrate may be foam, a film, a mesh, a felt, or a perforated film, which is made of a conductive material. More specifically, the conductive substrate is laminated together with the insulator and a part of the conductive substrate is exposed to the surface by the open pore channel formed in the insulator, such that the conductive substrate may be the foam, the film, or the felt, which is made of the conductive material. The conductive material of the conductive substrate may be a conductive material that has excellent conductivity and is chemically stable at the time of charging and discharging the battery such as graphite, graphene, titanium, copper, platinum, aluminum, nickel, silver, gold, or carbon nanotube and be a composite coated or laminated with different conductive materials.

In the current collector according to the exemplary embodiment of the present invention, the insulator may include a semiconductive or nonconductive (insulating) material. In detail, specific resistance of the insulator at 295K may be $10^{-4}$ to $10^{20}$ $\Omega cm$, specifically, $10^{-1}$ to $10^{20}$ $\Omega cm$, more specifically, $10^{10}$ to $10^{20}$ $\Omega cm$, and further more specifically, $10^{12}$ to $10^{20}$ $\Omega cm$.

In the current collector according to the exemplary embodiment of the present invention, the insulator may be a semiconductive material. A specific example of the semiconductive material may include a Group IV semiconductor containing silicon (Si), germanium (Ge), or silicon germanium (SiGe); a group III-V semiconductor containing gallium arsenide (GaAs), indium phosphorus (InP), or gallium phosphorus (GaP); a group II-VI semiconductor containing cadmium sulfide (CdS) or zinc telluride (ZnTe); a group IV-VI semiconductor containing lead sulfide (PbS); a mixture thereof; or a laminate in which each of at least two thereof is laminated while forming a layer. In this case, crystallographically, the semiconductive material may have a crystalline phase, an amorphous phase, or a mixed phase of crystalline and amorphous phases. As a non-restrictive example, the insulator may be silicon.

In the current collector according to the exemplary embodiment of the present invention, the insulator may be an insulating material containing ceramic. A specific example of the insulating material containing ceramic may include semiconductor oxides, semiconductor nitrides, semiconductor carbides, metal oxides, metal carbides, metal nitrides, a mixture thereof, or a laminate in which each of at least two thereof is laminated while forming a layer. In this case, a semiconductor of the semiconductor oxides, the semiconductor nitrides, or the semiconductor carbides may include the Group semiconductor, the group III-V semiconductor, the group II-VI semiconductor, the group IV-VI semiconductor, or the mixture thereof as described above. In this case, crystallographically, the insulating material containing ceramic material may have a crystalline phase, an amorphous phase, or a mixed phase of crystalline and amorphous phases. As a non-restrictive example, the insulator may be glass or quartz.

In the current collector according to the exemplary embodiment of the present invention, the insulator may be a polymer. In detail, the insulator may be a semiconductive or insulating polymer or a flexible polymer. Any polymer may be used as long as the polymer has heat resistance so as to be thermally stable in an operation temperature of a battery and is stable so as not to chemically react with other components of the battery such as an electrolyte solution. In the case in which the insulator is the polymer, there are advantages in that fine processing of the open pore channel may be easy and the current collector may be easily processed in a shape suitable for a battery structure due to flexibility and processability of the polymer. A non-restrictive and specific example of the polymer may include polyetheretherketone (PEEK), polyetherketone (PEK), polyetherimide (PEI), polycarbonate (PC), polytetrafluoroethylene (PEFE), or a mixture thereof.

In the current collector according to the exemplary embodiment of the present invention, a fluid may flow in the insulator formed with the open pore channel (hereinafter, porous insulator) due to an open pore structure. As an example, the porous insulator may include a plurality of surface pores having an opening part in a surface of the insulator and a plurality of internal pores, wherein the surface pores and the internal pores are connected with each other to form the open pore channel, and the fluid may pass through the porous insulator via the pore channel. In the case in which an electrode of the battery is immersed into the liquid medium, in view of a smooth movement of electrochemical active materials through the liquid medium and a contact with the current collector, the open pore channel of the porous insulator may include a through pore penetrating through at least two opposite faces facing each other, and the fluid may pass through the porous insulator via the pore channel including the through pore. In this case, the fluid may mean a liquid component in constituent components of a general secondary battery. As an example, the fluid may mean the liquid medium into which the current collector is immersed, and the liquid medium may include an electrolyte solution or a cathode solution of the battery.

FIG. 1 is a transparent perspective view showing a laminate in which a conductive substrate 100 and a insulator 200 formed with open pore channels 210 are laminated in the current collector according to the exemplary embodiment of the present invention.

As shown in FIG. 1, the insulator 200 may be a porous insulator in which the opened pore channels 210 penetrating through two surfaces facing each other are formed and laminated so that one of the two faces in which opening parts of the open pore channels 210 are positioned and the conductive substrate 100 contact each other, thereby forming the laminate.

FIG. 1 shows the case in which the conductive substrate 100 and the insulator 200 have a flat shape (plate shape), but shapes of the conductive substrate and the insulator may be changed according to the entire structure and shape of the secondary battery to be designed.

Figure 2A:
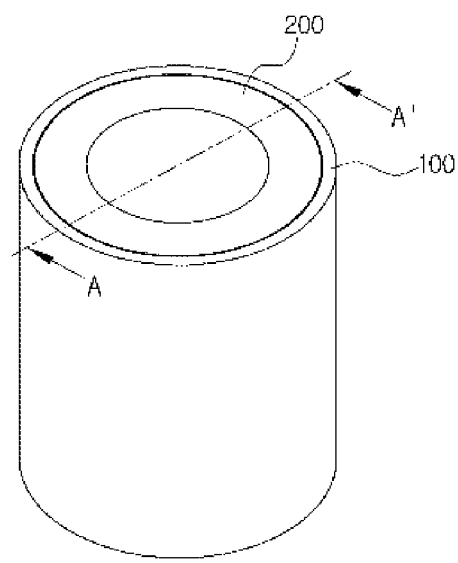
FIGS. 2A and 2B are a perspective view and a cross-sectional view of the current collector according to another exemplary embodiment of the present invention, respectively.
Figure 2B:
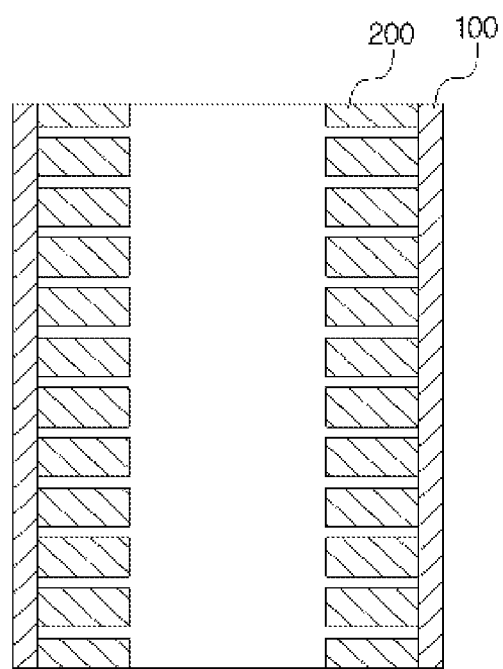

FIG. 2A is a perspective view of the laminate in which the conductive substrate 100 and insulator 200 are laminated in the current collector according to another exemplary embodiment of the present invention, and FIG. 2B is a cross-sectional view of the laminate. As shown in FIGS. 2A and 2B, the insulator 200 may have a hollow cylindrical shape, and the conductive substrate 100 may have a tube shape in which the conductive substrate 100 encloses an outer face of the cylindrical insulator. In the case in which the insulator 200 has a hollow cylindrical shape, the open pore channel 210 may be formed so as to penetrate a cylinder in a thickness direction.

As shown in FIGS. 2A and 2B, in the case in which the insulator 200 and the conductive substrate 100 do not have a plate shape but a curved shape, the insulator 200 and the conductive substrate 100 may have shapes corresponding to each other and form a concentric structure.

FIGS. 2A and 2B show a shape in which the conductive substrate 100 encloses the outer side face of the insulator 200, but the shape of the current collector according to the exemplary embodiment of the present invention is not limited thereto. More specifically, when the insulator 200 has the hollow cylindrical shape, the conductive substrate 100 may be formed and positioned so as to have a tube shape in which the conductive substrate 100 contacts with an inner face of the hollow cylinder or entirely fill an inner space of the hollow cylinder.

Figure 3A:
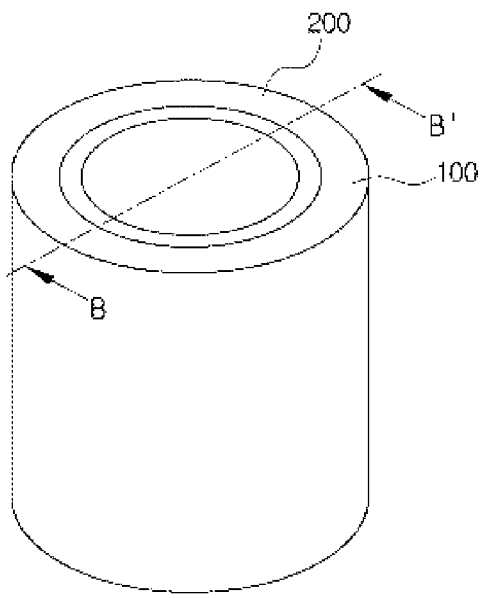
FIGS. 3A and 3B are a perspective view and a cross-sectional view of the current collector according to another exemplary embodiment of the present invention, respectively.
Figure 3B:
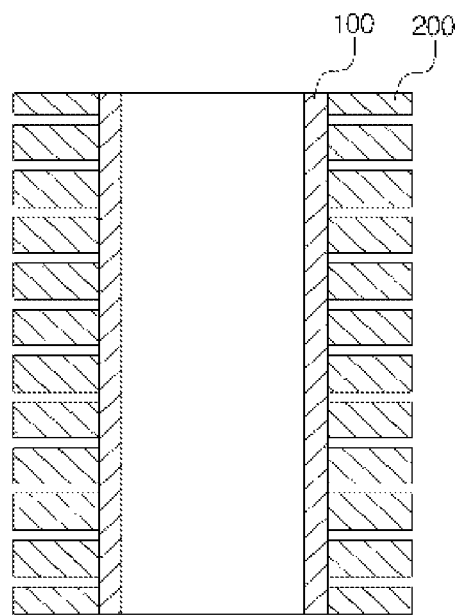

In detail, FIG. 3A is a perspective view of an example the laminate including the tube-shaped conductive substrate 100 and the insulator 200 enclosing the outer face of the conductive substrate 100, and FIG. 3B is a cross-sectional view thereof. That is, the laminate may include the tube-shaped conductive substrate 100 and the insulator 200 enclosing the outer side face of the conductive substrate 100 based on the tube-shaped conductive substrate 100.

The structure of the laminate described based on to FIGS. 1 to 3B may be appropriately selected and changed according to the structure of the battery to be designed. In detail, in the case in which the battery to be designed is a plate type battery, the current collector including the laminate described based on FIG. 1 may be used, and in the case in which the battery to be designed is a non-plate type battery (for example, tube type battery), the current collector including the laminate described based on FIGS. 2A and 2B and/or 3A and 3B may be used. More specifically, in the case in which the battery is the tube type battery and the current collector positioned at a central portion of a tube structure, the current collector described based on FIGS. 3A and 3B or a current collector similar to the current collector described based on FIGS. 3A and 3B except that the conductive substrate is not a tube type substrate but a bar type (rod type) substrate may be used. In the case in which the battery is the tube type battery and the current collector is positioned adjacently to an outer portion of the tube structure, the current collector including the laminate described based on FIGS. 2A and 2B may be used. In the case in which the battery is the tube type battery and the current collector is positioned adjacently to the center of the tube structure, the current collector including the laminate described based on FIGS. 3A and 3B may be used. Describing structures of a sodium battery and a current collector based on a sodium battery using the above-mentioned current collector as a cathode current collector, in the case of a plate type sodium battery, the current collector described based on FIG. 1 may be used, in the case of a tube type sodium battery in which an anode is positioned at a central portion and a cathode is positioned at an outer portion, the current collector described based on FIG. 2 may be used, and in the case of a tube type sodium battery in which a cathode is positioned at a central portion and an anode is positioned at an outer portion, the current collector described based on FIG. 3 may be used. In this case, as described above, in the structure of the current collector shown in FIG. 3, the conductive substrate may have a tube or rod shape.

As described above, as the insulator formed with the open pore channel and the conductive substrate are laminated so as to allow one face in which the opening part of the open pore channel is positioned to form a laminate interface, the surface of conductive substrate may be partially exposed by the open pore structure of the porous insulator, in more detail, the open pore channel.

In detail, the conductive substrate and the porous insulator contact each other while forming an interface. A region of the conductive substrate contacting with the open pore channel is exposed to the surface, and a region contacting with the insulator itself may be shaded by the insulator.

Figure 4A:
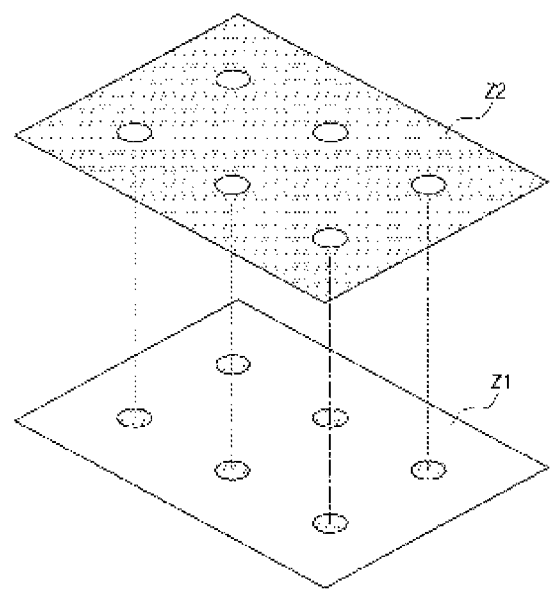
FIG. 4A is a conceptual view showing a surface of the current collector according to the exemplary embodiment of the present invention.
Figure 4B:
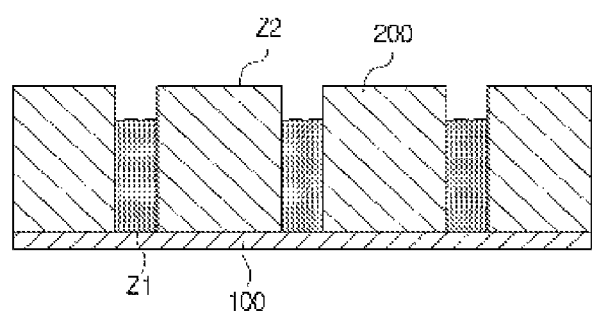
FIG. 4B is a conceptual view of the case in which a metal is reduced.
Figure 4C:
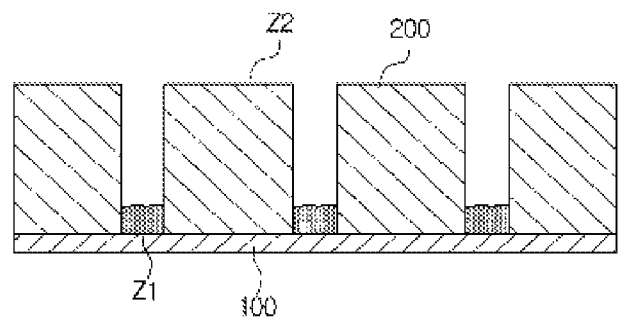
FIG. 4C is a conceptual view of the case in which the metal is oxidized.

FIG. 4A is a structural view showing only a surface of a current collector in which a nonconductive surface and a conductive surface co-exist in the current collector according to the present invention, FIG. 4B is a conceptual view showing a process in which a metal is electroplated on a current collector during electrochemical reactions of a secondary battery, and FIG. 4C is a conceptual view showing an oxidation process of the electroplated metal during the electrochemical reactions of the secondary battery. In order to assist in the clear understanding, FIGS. 4A to 4C show the current collector under the assumption that the battery has a plate type structure, but the current collector according to the present invention is not limited to the structure shown in FIGS. 4A to 4C.

As shown by way of example in FIGS. 4A to 4C, according to the exemplary embodiment of the present invention, the current collector collecting electric charges in the battery and electrically connecting the battery with the outside may include the conductive substrate and the porous insulator, and the porous insulator has a structure contacting with the current collector while having the open pore structure. Therefore, the exposed surface of the conductive substrate in the current collector may be limited, the exposed surface of the conductive substrate (conductive surface Z1 of FIG. 4A) and the surface by the porous insulator (nonconductive surface, Z2 of FIG. 4A) may be formed on different planes (Z1 and Z2 in FIG. 4A).

Therefore, when the electroplating of at least one metal selected from alkali metals, transition metals, and Groups 12 to 14 metals is generated during the electrochemical reactions of the battery, the metal may be selectively electroplated on the conductive surface Z1, non-uniform electroplating caused by simultaneous electroplating may be prevented by this selective electroplating, and physical separation caused by non-uniform electroplating of the metal may be prevented. In addition, as the conductive surface Z1 and the nonconductive surface Z2 are formed on the different planes by the open pore structure (channel), the metal may be electroplated while filling the open pore channel in a direction from the conductive surface to the nonconductive surface as shown in FIG. 4B, and the metal in the open pore channel may be sequentially oxidized in a direction from the nonconductive surface to the conductive surface as shown in FIG. 4C, such that separation of metal particles by non-uniform oxidation may be prevented, thereby making it possible to prevent capacity of the battery from being reduced.

In the current collector for a secondary battery according to the embodiment of the present invention, as the example shown in FIGS. 1 to 3B, the insulator may be formed with a pore channel array in which a plurality of open pore channels are arrayed to be spaced apart from each other. The conductive substrate may form a current carrying path between the conductive substrate and the outside of the battery, serve as a source supplying electric charges (for example, electrons) used in the electrochemical reaction, and serve to form a uniform electric field in which the electrochemical reaction of electrode materials (active materials) is carried out. Supply of the electric charges and formation of the electric field is performed by the conductive substrate may be limited to a region of the conductive substrate in which the open pore channels are formed (positioned) by the insulator formed with the opened pore channels.

That is, in the insulator, the plurality of open pore channels are arrayed to be spaced apart from each other, and only the region of the conductive substrate exposed to the surface by this open pore channel array may selectively serve as the current collector according to the related art. In this case, the open pore channels arrayed to be spaced apart from each other may be regularly or irregularly arrayed.

In the current collector for a secondary battery according to the exemplary embodiment of the present invention, a surface area of a surface of the conductive substrate exposed by the open pore channel may satisfy the following Correlation Equation.

$$0.05A_s \leq A_p \leq 0.8A_s \qquad \text{(Correlation Equation 1)}$$

In Correlation Formula 1, $A_s$ is a surface area of one face of the conductive substrate, and $A_p$ is the surface area of the conductive substrate exposed by the open pore channel. That is, Correlation Equation 1 indicates an area ratio ($A_p/A_s$) of the surface of the conductive substrate exposed to the surface by the open pore channel to a total surface area of the conductive substrate forming the interface with the insulator (that is, a total surface area of the interface).

In Correlation Formula 1, in the case in which the area ratio of the portion exposed to the surface by the open pore channel is less than 0.05, a surface area of a portion in which the electrochemical reaction of the battery occurs is excessively small, efficiency of the battery and a charge and discharge rate may be reduced, and in the case in which the area ratio of the portion exposed to the surface by the open pore channel is more than 0.8, an interval between the open pore channels formed in the insulator is excessively narrow, physical stability of the current collector may be reduced by channel walls of thin open pore channels. That is, the area ratio of the portion exposed to the surface by the open pore channel is in a range of 0.05 to 8, specifically 0.4 to 0.8, more specifically 0.6 to 0.8, such that reduction in efficiency of the battery and the charge and discharge rate by the insulator may be prevented, and permanent capacity reduction due to non-uniform reduction (electroplating) and oxidation (dissolution) of a metal may be prevented. In addition, in the insulator formed with the open pore channel array, it is possible to prevent an impact resistance property of the current collector from being deteriorated by a brittle property of the insulator itself.

In the current collector according to the exemplary embodiment of the present invention, the open pore channel may have a circular, oval, or polygonal cross section, wherein the polygonal cross section may include a triangular, rectangular, pentagonal, hexagonal, or octagonal cross section.

In the current collector according to the exemplary embodiment of the present invention, density and a cross-sectional area of the open pore channel may be determined so that the above-mentioned Correlation Equation 1 is satisfied. In this case, the specific density and a cross-sectional area of the open pore channel may be changed in consideration of design capacity of the battery. However, in the case in which the cross-sectional area of the open pore channel is excessively small, resistance by metal formed in the channel so as to fill the open pore channel from the surface of the conductive substrate exposed to the surface may be increased, the processing may not be easy due to significantly high density of the channel, and the current collector may be easily damaged by physical impact. Further, in the case in which the cross-sectional area of the open pore channel is excessively large, an effect of the present invention capable of allowing reduction (electroplating) and oxidation (dissolution) of metals generated at the time of charging and discharging the battery to be generated at a predetermined position in a predetermined direction to prevent the permanent capacity reduction may be insignificant. That is, in the case in which the cross-sectional area of the open pore channel is excessively large, non-uniform reduction and oxidation of the metal may be generated at the surface of the conductive substrate exposed by a single open pore channel, such that capacity due to separation (separation from the current collector) of metal particles may be permanently reduced.

Therefore, the cross-sectional area of the open pore channel may be 0.01 $mm^2$ to 80 $mm^2$, specifically 0.01 $mm^2$ to 20 $mm^2$, more specifically 0.01 $mm^2$ to 5 $mm^2$, the density of the open pore channel may be determined in consideration of the above-mentioned cross-sectional area and Correlation Equation 1.

A length of the open pore channel may be appropriately designed in consideration of the capacity of the battery to be designed as well as the density and cross-sectional area of the above-mentioned open pore channel. In detail, the length of the open pore channel may be a length that the open pore channel may be filled by the electroplated metal when the reduction reaction is completed while having a predetermined margin space, and a length of the margin space remaining an empty space when the reduction reaction is completed may be 1 to 30% of the length of the open pore channel.

In the current collector according to the exemplary embodiment of the present invention, sizes of the open pore channels formed in the insulator may be the same as or different from each other. In a large-capacity, a flux of metal ions (as an example, in the case of a lithium secondary battery, lithium ions, and in the case of a sodium secondary battery, sodium ions) moving a cathode or anode space may be changed according to the position, and the electric field formed through the current collector may also be changed according to the position. In consideration of non-uniformity due to the large capacity, an open pore channel having a relatively large cross-sectional area may be formed in a region of the insulator corresponding to a region in which a relatively low flux of the metal ion and/or a relatively small electric field is formed. As a specific example, a cross-sectional area of an open pore channel formed at an edge region of the insulator may be larger than that of an open pore channel formed at a central region of the insulator.

In the current collector according to the exemplary embodiment of the present invention, a cross-sectional area of a pore may be constant or changed in a length direction of the open pore channel. In the case in which the cross-sectional area is changed, the cross-sectional area may be continuously or discontinuously changed. More specifically, in the case in which the reduction (electroplating) of the metal is generated according to the charge and discharge reaction of the battery, the metal is reduced from the surface of the conductive substrate exposed to the surface by the open pore channel, and the electroplating of the reduced metal may be generated along the pore channel, and in the case in which the oxidation (dissolution) of the metal is generated, oxidation of the metal may be sequentially generated from a surface of the metal contacting with a liquid medium in the metal filled in the pore channel, that is, a surface of the metal in the open pore channel to the surface of the conductive substrate. In the case in which the cross-sectional area of the pore is constant in the length direction of the open pore channel, capacity reduction due to permanent separation of the metal particles caused by non-uniform and partial oxidation and reduction of the metal may be effectively prevented. Further, in the case in which the cross-sectional area of the pore is changed in the length direction of the open pore channel, it is possible to prevent a charge and discharge rate from being decreased by a charge and discharge reaction position of the battery that is limited to the inside of the channel of the open pore channel. In detail, an open pore channel taped so as to have a cross-sectional area gradually increased from a portion contacting with the conductive substrate to a portion facing the conductive substrate while satisfying the above-mentioned cross-sectional area of the open pore channel may be formed.

The current collector according to the exemplary embodiment of the present invention may be a current collector for an alkali metal secondary battery, wherein the alkali metal secondary battery may include a lithium secondary battery or a sodium secondary battery.

The present invention includes a secondary battery provided with the above-mentioned current collector. The above-mentioned current collector may be a cathode current collector and/or an anode current collector. The secondary battery provided with the above-mentioned current collector may include a lithium secondary battery or a sodium secondary battery.

The present invention includes a sodium secondary battery provided with the above-mentioned current collector.

The sodium secondary battery according to the present invention may include an anode containing sodium, a cathode immersed into a cathode solution and including the current collector as described above as a cathode current collector, and a sodium ion conductive solid electrolyte separating the anode and the cathode solution from each other. That is, the sodium secondary battery according to the exemplary embodiment of the present invention includes the sodium ion conductive solid electrolyte separating an anode space and a cathode space from each other, the anode positioned in the anode space and containing sodium, the cathode solution positioned in the cathode space, and the cathode immersed into the cathode solution and including the current collector as described above.

The sodium secondary battery according to the exemplary embodiment of the present invention may be a battery in which electroplating of the metal is generated at the cathode during a battery charge or discharge process. More specifically, the sodium secondary battery may be a battery in which the electroplating of the metal is generated at the cathode during the battery discharge process. In this case, the electroplated metal may be at least one metal selected from a group consisting of transition metals and Groups 12 to 14 metals.

More specifically, the electrochemical (charge and discharge) reaction of the battery may occur between sodium, at least one metal selected from the transition metals and Groups 12 to 14 metals (hereinafter, referred to as a cathode active metal), and halogen. In addition, the cathode solution may contain a solvent dissolving sodium halide and cathode active metal halide and a halide of at least one metal selected from a group consisting of the alkali metals, the transition metals, and Groups 12 to 14 metals.

That is, the sodium secondary battery according to the exemplary embodiment of the present invention may include the anode containing sodium; the cathode solution containing the solvent dissolving the halides of the alkali metal and the cathode active metal; the cathode including the above-mentioned current collector as the cathode current collector and immersed into the cathode solution; and the sodium ion conductive solid electrolyte separating the anode and the cathode solution from each other.

In this case, the alkali metal may include lithium (Li), sodium (Na), and potassium (K), the transition metal may include titanium (Ti), vanadium (V), chromium (Cr), manganese (Mn), iron (Fe), cobalt (Co), nickel (Ni), and copper (Cu), and Groups 12 to 14 metals may include zinc (Zn), aluminum (Al), cadmium (Cd), and tin (Sn).

In the sodium secondary battery according to the exemplary embodiment of the present invention, a charge reaction is carried out according to the following Reaction Formula 1, and a discharge reaction is carried out according to the following Reaction Formula 2, and at the time of charging and discharging the battery, sodium halide and cathode active metal halide of Reaction Formulas 1 and 2 may be dissolved in the cathode solution to thereby be in a liquid-state.

$$mNaX + M \rightarrow mNa + MX_m \quad \text{(Reaction Formula 1)}$$

$$mNa + MX_m \rightarrow mNaX + M \quad \text{(Reaction Formula 2)}$$

In Reaction Formulas 1 and 2, M is at least one metal (cathode active metal) selected from a group consisting of the transition metals and Groups 12 to 14 metals, X is a halogen atom, and m is a natural number of 1 to 4. In detail, in Reaction Formulas 1 and 2, m may be a natural number corresponding to a positive valence of the metal M.

In detail, in the sodium secondary battery according to the exemplary embodiment of the present invention, based on a charge state of the battery by the charge reaction according to Reaction Formula 1, the cathode may be a current collector itself including a laminate in which the above-mentioned conductive substrate and insulator are laminated; or the conductive substrate of the current collector is a cathode active metal itself, or the cathode active metal is coated on or filled in a heterogeneous conductive film, felt, or foam. That is, based on the charge state, the cathode may be configured of only the cathode current collector. Based on a discharge state of the battery by the discharge reaction according to Reaction Formula 2, the cathode may be a current collector in which the open pore channel of the insulator is filled with the cathode active metal electroplated from the cathode solution.

In the sodium secondary battery according to the exemplary embodiment of the present invention, as the charge and discharge are repeatedly performed, a metal ionization process in which the cathode active metal positioned in the open pore channel of the current collector (cathode current collector) is converted into cathode active metal ions to thereby be dissolved in the cathode solution, and a metal reduction process in which the dissolved cathode active metal ions are electroplated in the open pore channel of the current collector (cathode current collector) again may be repeatedly performed.

In describing the sodium secondary battery according to the exemplary embodiment of the present invention, for clear understanding, the cathode and the charge and discharge reaction are described above, based on the reaction products or materials (the sodium halide, the cathode active metal halide, or the like) at the time of the charge and discharge reaction of Reaction Formulas 1 and 2. However, according to the present invention, as all of the reaction products of the sodium halide and the cathode active metal halide except for the electroplated metal exist in a state in which they are dissolved in the solvent, the sodium halide may be interpreted as the sodium ion and halide ion, and the cathode active metal halide may be interpreted as ions of at least one metal (cathode active metal) selected from the transition metals and Groups 12 to 14 metals and the halide ion.

As described above, as the cathode current collector includes the laminate in which the insulator formed with the open pore channel and the conductive substrate are laminated, electroplating of the cathode active metal may proceed in a direction in which the electroplated metal fills in the pore channel from one end of the conductive substrate of the open pore channel, and oxidation of the cathode active metal (ionization of the cathode active metal, dissolution of the cathode active metal in the cathode solution as cathode active metal ions) may proceed in a direction from a surface contacting with the cathode solution of the cathode active metal filled in the open pore channel to the conductive substrate. Non-uniform electroplating may be prevented by this selective and directional electroplating of the cathode active metal, and formation of a non-uniform electric field may also be prevented. In addition, at the time of ionization of the cathode active metal, the metal in the open pore channel may also be directionally and uniformly ionized to thereby be dissolved in the cathode solution, such that separation of the cathode active metal particles by non-uniform ionization may be prevented.

In the sodium secondary battery according to the exemplary embodiment of the present invention, a concentration of the active material containing the cathode active metal halide and/or the sodium halide that are dissolved in the solvent of the cathode solution may be directly related to an amount of the material capable of participating in the electrochemical reaction of the battery and affect energy capacity per unit volume of the battery and conductivity of the ions (including sodium ions) in the cathode solution.

In the sodium secondary battery according to the exemplary embodiment of the present invention, the cathode solution may contain the active material at a concentration of 0.1 to 10M, substantially, 0.5 to 10M, more substantially, 1 to 6M, and most substantially 2 to 5M.

More specifically, in the sodium secondary battery according to the exemplary embodiment of the present invention, the cathode solution may contain the cathode active metal halide at a concentration of 0.1 to 10M, substantially, 0.5 to 10M, more substantially, 1 to 6M, and most substantially 2 to 5M. According to the charge or discharge state of the battery, the cathode active metal may exist in the cathode solution in an ionic state or be electroplated on the cathode current collector, such that an ionic concentration of the cathode active metal in the cathode solution may be changed. Here, the concentration of the cathode active metal halide in this cathode solution may be a concentration based on the charge state.

Based on the charge state, in the case in which the cathode active metal halide has an excessively low concentration of less than 0.1, conductivity of the ions participating in the electrochemical reaction of the battery such as the sodium ion is excessively decreased, such that efficiency of the battery may be decreased, and capacity itself of the battery may be significantly low. Further, in the case in which the concentration of the cathode active metal halide is more than 10M, conductivity of the sodium ion may be decreased by the metal ion having the same charge as that of the sodium ion. However, ionic conductivity in the cathode solution may be adjusted by additionally adding an additive capable of increasing conductivity of the sodium ion while not participating in a net reaction of the battery, such as excess sodium halide to be described below, and the concentration of the cathode active metal halide may be adjusted according to the use of the battery and the design capacity thereof.

In the sodium secondary battery according to the exemplary embodiment of the present invention, the concentration of the sodium halide may also be determined by the concentration of the cathode active metal halide in the cathode solution according to the above-mentioned Reaction Formula 2, but in order to improve conductivity of the sodium ion in the cathode solution, the cathode may further contain sodium halide together with the cathode active metal halide based on the charge state.

More specifically, according to the exemplary embodiment of the present invention, when the charge and discharge reactions represented by Reaction Formulas 1 and 2 are performed, in order to improve conductivity of the sodium ion and induce more rapid charge or discharge reaction in the cathode solution containing the cathode active metal ion at a predetermined concentration, the cathode solution may contain sodium ion and halide ion at concentrations higher than those determined by the discharge reaction according to the Reaction Formula 2.

Therefore, the cathode solution may contain the cathode active metal halide and sodium halide that are dissolved in the solvent. In detail, the cathode solution in the charge state may contain the cathode active metal halide and the sodium halide that are dissolved in the solvent. Therefore, a liquid-state cathode solution in the charge state may contain the metal ion, the sodium ion, and the halide ion.

In the sodium secondary battery according to the exemplary embodiment of the present invention, the cathode solution in the charge state may further contain 0.1 to 3M of sodium halide based on 1M of the cathode active metal halide. Conductivity of the sodium ion in the cathode solution may be improved through an amount (molar ratio) of the sodium halide based on the cathode active metal halide, and the charge and discharge reactions of Reaction Formulas 1 and 2 may be rapidly and effectively carried out. Further, conductivity of the sodium ion and the reaction rate may be secured even though an operation temperature of the battery is low.

In the sodium secondary battery according to the exemplary embodiment of the present invention, the cathode active metal halide may be a halide defined as the following Chemical Formula 1.

$$MX_m \qquad \text{(Chemical Formula 1)}$$

In Chemical Formula 1, M may be at least one selected from nickel (Ni), iron (Fe), copper (Cu), zinc (Zn), cadmium (Cd), titanium (Ti), aluminum (Al), and tin (Sn), X is at least one selected from iodine (I), bromine (Br), chlorine (Cl), and fluorine (F), and m is a natural number of 1 to 4. Here, m may be a natural number corresponding to the valence of the metal.

In the sodium secondary battery according to the exemplary embodiment of the present invention, the alkali metal halide may be sodium halide, wherein the sodium halide may be a halide defined as the following Chemical Formula 2.

$$NaX \qquad \text{(Chemical Formula 2)}$$

In Chemical Formula 2, X is at least one selected from iodine (I), bromine (Br), chlorine (Cl), and fluorine (F).

More specifically, in the sodium secondary battery according to the exemplary embodiment of the present invention, as the solvent of the cathode, any solvent may be used as long as the solvent may dissolve the sodium halide simultaneously with dissolving the metal halide, but a non-aqueous organic solvent, an ionic liquid, or a mixture thereof may be preferably used in view of improving ionic conductivity of sodium ion, stabilizing charge and discharge cycle characteristics, and improving preservation characteristics capable of preventing self-discharging.

As the non-aqueous organic solvent, at least one selected from alcohol based solvents, polyol based solvents, heterocyclic hydrocarbon based solvents, amide based solvents, ester based solvents, ether based solvents, lactone based solvents, carbonate based solvents, phosphate based solvents, sulfone based solvents, and sulfoxide based solvents may be used, and as the ionic liquid, at least one selected from imidazolium based ionic liquids, piperidinium based ionic liquids, pyridinium based ionic liquids, pyrrolidinium based ionic liquids, ammonium based ionic liquids, phosphonium based ionic liquids, and sulfonium based ionic liquids may be used.

In detail, in the sodium secondary battery according to the exemplary embodiment of the present invention, as an example of the non-aqueous organic solvent capable of stably maintaining the liquid phase at an operation temperature and pressure of the secondary battery, easily diffusing the sodium ion introduced through the solid electrolyte, not generating undesired side-reactions, having stable solubility for the metal halide and sodium halide, stably performing the charge and discharge cycle for a long period time, and having excellent preservation characteristics, there is at least one organic solvent selected from a group consisting of 1,2-ethanediol, 1,2-propanediol, 1,3-propanediol, 1,2-butanediol, 1,3-butandiol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpineol, dihydro terpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, triazole, isothiazole, oxadiazole, oxatriazole, dioxazole, oxazolone, oxatriazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pteridine, phenazine, phenothiazine, phenoxazine, and acridine.

An example of the ionic liquid may include at least one solvent selected from a group consisting of 1-butyl-3-methylpyridinium bromide, 1-butyl-4-methylpyridinium bromide, 1-butylpyridinium bromide, 1-butyl-2-methylpyridinium bromide, 1-hexylpyridinium bromide, 1-ethylpyridinium bromide, 1-propyl-2-methylpyridinium bromide, 1-propyl-3-methylpyridinium bromide, 1-propyl-4-methylpyridinium bromide, 1-propylpyridinium bromide, 1-ethyl-2-methylpyridinium bromide, 1-ethyl-3-methylpyridinium bromide, 1-ethyl-4-methylpyridinium bromide, 1-ethylpyridinium iodide, 1-butylpyridinium iodide, 1-hexylpyridinium iodide, 1-butyl-2-methylpyridinium iodide, 1-butyl-3-methylpyridinium iodide, 1-butyl-4-methylpyridinium iodide, 1-propylpyridinium iodide, 1-butyl-3-methylpyridinium chloride, 1-butyl-4-methylpyridinium chloride, 1-butylpyridinium chloride, 1-butyl-2-methylpyridinium chloride, 1-hexylpyridinium chloride, 1-butyl-3-methylpyridinium hexafluorophosphate, 1-1-butyl-4-methylpyridinium hexafluorophosphate, 1-butylpyridinium hexafluorophosphate, 1-ethylpyridinium hexafluorophosphate, 1-hexylpyridinium hexafluorophosphate, 1-butyl-2-methylpyridinium hexafluorophosphate, 1-propylpyridinium hexafluorophosphate, 1-butyl-2-methylpyridinium trifluoromethanesulfonate, 1-butyl-3-methylpyridinium trifluoromethanesulfonate, 1-butyl-4-methylpyridinium trifluoromethanesulfonate, 1-hexylpyridinium trifluoromethanesulfonate, 1-butylpyridinium trifluoromethanesulfonate, 1-ethylpyridinium trifluoromethanesulfonate, 1-propylpyridinium trifluoromethanesulfonate, 1-butyl-3-methylpyridinium hexafluorophosphate, 1-butyl-4-methylpyridinium hexafluorophosphate, 1-butylpyridinium hexafluorophosphate, 1-hexylpyridinium hexafluorophosphate, 1-butyl-2-methylpyridinium hexafluorophosphate, 1-ethylpyridinium hexafluorophosphate, 1-propylpyridinium hexafluorophosphate, 1-ethylpyridinium bis(trifluoromethylsulfonyl)imide, 1-propylpyridinium bis(trifluoromethylsulfonyl)imide, 1-butylpyridinium bis(trifluoromethylsulfonyl)imide, 1-ethyl-3-methylpyridinium bis(trifluoromethylsulfonyl)imide, 3-methyl-1-propylpyridinium bis(trifluoromethylsulfonyl)imide, 1-butyl-3-methylpyridinium bis(trifluoromethylsulfonyl)imide, 1-ethyl-4-methylpyridinium bis(trifluoromethylsulfonyl)imide, 4-methyl-1-propylpyridinium bis(trifluoromethylsulfonyl)imide, 1-butyl-4-methylpyridinium bis(trifluoromethylsulfonyl)imide, 1-butyl-2-methylpyridinium bis(trifluoromethylsulfonyl)imide, 1-ethyl-2-methylpyridinium bis(trifluoromethylsulfonyl)imide, 2-methyl-1-propylpyridinium bis(trifluoromethylsulfonyl, 1-ethyl-3-methylimidazolium methylcarbonate, 1-butyl-3-methylimidazolium methylcarbonate, 1-ethyl-3-methylimidazolium tricyanomethanide, 1-butyl-3-methylimidazolium tricyanomethanide, 1-ethyl-3-methylimidazolium bis(perfluoroethylsulfonyl)imide, 1-butyl-3-methylimidazolium bis(perfluoroethylsulfonyl)imide, 1-ethyl-3-methylimidazolium dibutylphosphate, 1-butyl-3-methylimidazolium dibutylphosphate, 1-ethyl-3-methylimidazolium methyl sulfate, 1,3-dimethylimidazolium methyl sulfate, 1-ethyl-3-methylimidazolium ethyl sulfate, 1,3-diethylimidazolium ethyl sulfate, 1,3-dimethylimidazolium dimethyl phosphate, 1-ethyl-3-methylimidazolium dimethyl phosphate, 1-butyl-3-methylimidazolium dimethyl phosphate, 1-ethyl-3-methylimidazolium diethyl phosphate, 1,3-diethylimidazolium diethyl phosphate, 1-butyl-3-methylimidazolium hydrogen sulfate, 1-ethyl-3-methylimidazolium hydrogen sulfate, 1-butyl-3-methylimidazolium methanesulfonate, 1-ethyl-3-methylimidazolium methanesulfonate, 1-ethyl-3-methylimidazolium tosylate, 1-ethyl-3-methylimidazolium 1,1,2,2-tetrafluoroethanesulfonate, 1-methyl-3-propylimidazolium 1,1,2,2-tetrafluoroethanesulfonate, 1-butyl-3-methylimidazolium 1,1,2,2-tetrafluoroethanesulfonate, 1-benzyl-3-methylimdiazolium 1,1,2,2-tetrafluoroethanesulfonate, 1-butyl-3-ethylimidazolium 1,1,2,2-tetrafluoroethanesulfonate, 1-methylimidazolium 1,1,2,2-tetrafluoroethanesulfonate, 1-ethylimidazolium 1,1,2,2-tetrafluoroethanesulfonate, 1-ethyl-3-methylimidazolium thiocyanate, 1-butyl-3-methylimidazolium thiocyanate, 1-ethyl-3-methylimidazolium dicyanamide, 1-butyl-3-methylimidazolium dicyanamide, 1-allyl-3-methylimidazolium dicyanamide, 1-benzyl-3-methylimidazolium dicyanamide, 1-methyl-3-propylimidazolium iodide, 1-hexyl-3-methylimidazolium iodide, 1-ethyl-3-methylimidazolium iodide, 1,2-dimethyl-3-propylimidazolium iodide, 1-butyl-3-methylimidazolium iodide, 1-dodecyl-3-methylimidazolium iodide, 1-butyl-2,3-dimethylimidazolium iodide, 1-hexyl-2,3-dimethylimidazolium iodide, 1,3-dimethylimidazolium iodide, 1-allyl-3-methylimidazolium iodide, 1-butyl-3-methylimidazolium chloride, 1-allyl-3-methylimidazolium chloride, 1-(2-hydroxyethyl)-3-methylimidazolium chloride, 1,3-didecyl-2-methylimidazolium chloride, 1-hexyl-3-methylimidazolium chloride, 1-butyl-2,3-dimethylimidazolium chloride, 1-decyl-3-methylimidazolium chloride, 1-methyl-3-octylimidazolium chloride, 1-ethyl-3-methylimidazolium chloride, 1-methylimidazolium chloride, 1-hexadecyl-3-methylimidazolium chloride, 1-dodecyl-3-methylimidazolium chloride, 1-benzyl-3-methylimidazolium chloride, 1-methyl-3-tetradecylimidazolium chloride, 1-methyl-3-propylimidazolium chloride, 1-methyl-3-octadecylimidazolium chloride, 1-ethylimidazolium chloride, 1,2-dimethylimidazolium chloride, 1-ethyl-2,3-dimethylimidazolium trifluoromethanesulfonate, 1-ethyl-3-methylimidazolium trifluoromethanesulfonate, 1-butyl-3-methylimidazolium trifluoromethanesulfonate, 1-butyl-2,3-dimethylimidazolium trifluoromethanesulfonate, 1-decyl-3-methylimidazolium trifluoromethanesulfonate, 1-hexyl-3-methylimidazolium trifluoromethanesulfonate, 1-methyl-3-octylimidazolium trifluoromethanesulfonate, 1-dodecyl-3-methylimidazolium trifluoromethanesulfonate, 1-methylimidazolium trifluoromethanesulfonate, 1-ethylimidazolium trifluoromethanesulfonate, 1-methyl-3-propylimidazolium trifluoromethanesulfonate, 1-ethyl-3-methylimidazolium acetate, 1-butyl-3-methylimidazolium acetate, 1-ethyl-3-methylimidazolium trifluoroacetate, 1-butyl-3-methylimidazolium trifluoroacetate, 1-ethyl-3-methylimidazolium nitrate, 1-methylimidazolium nitrate, 1-ethylimidazolium nitrate, 1-butyl-3-methylimidazolium tetrachloroferrate(III), 1-ethyl-3-methylimidazolium bis(trifluoromethylsulfonyl)imide, 1-methyl-3-propylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-methyl-3-octylimidazolium bis(trifluoromethylsulfonyl)imide, 1-decyl-3-methylimidazolium bis(trifluoromethylsulfonyl) imide, 1-dodecyl-3-methylimidazolium bis(trifluoromethylsulfonyl)imide, 1-methyl-3-tetradecylimidazolium bis(trifluoromethylsulfonyl)imide, 1-hexadecyl-3-methylimidazolium bis(trifluoromethylsulfonyl)imide, 1-butyl-2,3-dimethylimidazolium bis(trifluoromethylsulfonyl)imide, 1-ethyl-2,3-dimethylimidazolium bis(trifluoromethylsulfonyl)imide, 1,2-dimethyl-3-propylimidazolium bis(trifluoromethylsulfonyl)imide, 1,3-diethylimidazolium bis(trifluoromethylsulfonyl)imide, 1,3-dimethylimidazolium bis(trifluoromethylsulfonyl)imide, 1-methyl-3-octadecylimidazolium bis(trifluoromethylsulfonyl)imide, 1-allyl-3-methylimidazolium bis(trifluoromethylsulfonyl)imide, 1-benzyl-3-methylimidazolium bis(trifluoromethylsulfonyl)imide, 1-methylimidazolium bis(trifluoromethylsulfonyl)imide, 1-ethylimidazolium bis(trifluoromethylsulfonyl)imide, 1,2-dimethylimidazolium bis(trifluoromethylsulfonyl)imide, 1-ethyl-3-propylimidazolium bis(trifluoromethylsulfonyl)imide, 1-butyl-3-ethylimidazolium bis(trifluoromethylsulfonyl)imide, 1-ethyl-3-vinylimidazolium bis(trifluoromethylsulfonyl)imide, 1-butyl-3-vinylimidazolium bis(trifluoromethylsulfonyl)imide, 1-methyl-3-pentylimidazolium bis(trifluoromethylsulfonyl)imide, 1-heptyl-3-methylimidazolium bis(trifluoromethylsulfonyl)imide, 1-methyl-3-nonylimidazolium bis(trifluoromethylsulfonyl)imide, 1-butyl-3-methylimidazolium hexafluorophosphate, 1-hexyl-3-methylimidazolium hexafluorophosphate, 1-methyl-3-octylimidazolium hexafluorophosphate, 1-butyl-2,3-dimethylimidazolium hexafluorophosphate, 1-decyl-3-methylimidazolium hexafluorophosphate, 1-dodecyl-3-methylimidazolium hexafluorophosphate, 1-ethyl-3-methylimidazolium hexafluorophosphate, 1-ethyl-2,3-dimethylimidazolium hexafluorophosphate, 1-methyl-3-propylimidazolium hexafluorophosphate, 1-methyl-3-tetradecylimidazolium hexafluorophosphate, 1-hexadecyl-3-methylimidazolium hexafluorophosphate, 1-methyl-3-octadecylimidazolium hexafluorophosphate, 1-benzyl-3-methylimidazolium hexafluorophosphate, 1,3-diethylimidazolium hexafluorophosphate, 1-ethyl-3-propylimidazolium hexafluorophosphate, 1-butyl-3-ethylimidazolium hexafluorophosphate, 1-methyl-3-pentylimidazolium hexafluorophosphate, 1-heptyl-3-methylimidazolium hexafluorophosphate, 1-methyl-3-nonylimidazolium hexafluorophosphate, 1-ethyl-2,3-dimethylimidazolium tetrafluoroborate, 1-ethyl-3-methylimidazolium tetrafluoroborate, 1-butyl-3-methylimidazolium tetrafluoroborate, 1-hexyl-3-methylimidazolium tetrafluoroborate, 1-methyl-3-octylimidazolium tetrafluoroborate, 1-(2-hydroxyethyl)-3-methylimidazolium tetrafluoroborate, 1-butyl-2,3-dimethylimidazolium tetrafluoroborate, 1-decyl-3-methylimidazolium tetrafluoroborate, 1-hexadecyl-3-methylimidazolium tetrafluoroborate, 1-dodecyl-3-methylimidazolium tetrafluoroborate, 1-methyl-3-propylimidazolium tetrafluoroborate, 1-benzyl-3-methylimidazolium tetrafluoroborate, 1-methyl-3-octadecylimidazolium tetrafluoroborate, 1-methyl-3-tetradecylimidazolium tetrafluoroborate, 1,3-diethylimidazolium tetrafluoroborate, 1-ethyl-3-propylimidazolium tetrafluoroborate, 1-butyl-3-ethylimidazolium tetrafluoroborate, 1-methyl-3-pentylimidazolium tetrafluoroborate, 1-heptyl-3-methylimidazolium tetrafluoroborate, 1-methyl-3-nonylimidazolium tetrafluoroborate, 1-ethyl-3-methylimidazolium bromide, 1-butyl-3-methylimidazolium bromide, 1-butyl-2,3-dimethylimidazolium bromide, 1-decyl-3-methylimidazolium bromide, 1-hexyl-3-methylimidazolium bromide, 1-methyl-3-octylimidazolium bromide, 1-methyl-3-propylimidazolium bromide, 1-dodecyl-3-methylimidazolium bromide, 1-ethyl-2,3-dimethylimidazolium bromide, 1,2-dimethyl-3-propylimidazolium bromide, 1-methylimidazolium bromide, 1-ethylimidazolium bromide, 1,3-diethylimidazolium bromide, 1-ethyl-3-propylimidazolium bromide, 1-butyl-3-ethylimidazolium bromide, 1-ethyl-3-vinylimidazolium bromide, 1-butyl-3-vinylimidazolium bromide, 1-heptyl-3-methylimidazolium bromide, 1-methyl-3-nonylimidazolium bromide, 1-(2-hydroxy-2-methyl-n-propyl)-3-methylimidazolium methanesulfonate, 1-methyl-1-propylpiperidinium bis(trifluoromethylsulfonyl)imide, (1-butyl-1-methylpiperidinium bis(trifluoromethylsulfonyl)imide, 1-butyl-1-methylpiperidinium trifluoromethanesulfonate, 1-methyl-1-propylpiperidinium trifluoromethanesulfonate, 1-methyl-1-propylpiperidinium hexafluorophosphate, 1-butyl-1-methylpiperidinium hexafluorophosphate, 1-methyl-1-propylpiperidinium tetrafluoroborate, 1-butyl-1-methylpiperidinium tetrafluoroborate, 1-methyl-1-propylpiperidinium bromide, 1-butyl-1-methylpiperidinium bromide, 1-butyl-1-methylpiperidinium iodide, 1-methyl-1-propylpiperidinium iodide, 1-butyl-1-methylpyrrolidinium bis(trifluoromethylsulfonyl)imide, 1-methyl-1-propylpyrrolidinium bis(trifluoromethylsulfonyl)imide, 1-methyl-1-octylpyrrolidinium bis(trifluoromethylsulfonyl)imide, 1-ethyl-1-methylpyrrolidinium bis(trifluoromethylsulfonyl)imide, 1-butyl-1-methylpyrrolidinium trifluoromethanesulfonate, 1-methyl-1-propylpyrrolidinium trifluoromethanesulfonate, 1-ethyl-1-methylpyrrolidinium trifluoromethanesulfonate, 1-butyl-1-methylpyrrolidinium hexafluorophosphate, 1-methyl-1-propylpyrrolidinium hexafluorophosphate, 1-ethyl-1-methylpyrrolidinium hexafluorophosphate, 1-butyl-1-methylpyrrolidinium tetrafluoroborate, 1-methyl-1-propylpyrrolidinium tetrafluoroborate, 1-ethyl-1-methylpyrrolidinium tetrafluoroborate, 1-butyl-1-methylpyrrolidinium bromide, 1-methyl-1-propylpyrrolidinium bromide, 1-ethyl-1-methylpyrrolidinium bromide, 1-butyl-1-methylpyrrolidinium chloride, 1-methyl-1-propylpyrrolidinium chloride, 1-butyl-1-methylpyrrolidinium iodide, 1-methyl-1-propylpyrrolidinium iodide, 1-ethyl-1-methylpyrrolidinium iodide, 1-butyl-1-methylpyrrolidinium dicyanamide, 1-methyl-1-propylpyrrolidinium dicyanamide, 1-butyl-1-methylpyrrolidinium 1,1,2,2-tetrafluoroethanesulfonate, 1-methyl-1-propylpyrrolidinium 1,1,2,2-tetrafluoroethanesulfonate, 1-butyl-1-methylpyrrolidinium methylcarbonate, 1-butyl-1-methylpyrrolidinium tricyanomethanide, methyltrioctylammonium bis(trifluoromethylsulfonyl)imide, butyltrimethylammonium bis(trifluoromethylsulfonyl)imide, choline bis(trifluoromethylsulfonyl)imide, tributylmethylammonium bis(trifluoromethylsulfonyl)imide, ethylammonium nitrate, methylammonium nitrate, propylammonium nitrate, dimethylammonium nitrate, butyltrimethylammonium methylcarbonate, methyltrioctylammonium methylcarbonate, N-ethyl-N-methylmorpholinium methylcarbonate, N,N-diethyl-N-methyl-N-(2-methoxyethyl)ammonium bis(trifluoromethylsulfonyl)-imide, N,N-diethyl-N-methyl-N-(2-methoxyethyl) ammonium tetrafluoroborate, butyltrimethylammonium 1,1,2,2-tetrafluoroethanesulfonate, tetraethylammonium 1,1,2,2-tetrafluoroethanesulfonate, 2-hydroxyethylammonium formate, choline dihydrogen phosphate, methyltrioctylammonium trifluoromethanesulfonate, trihexyltetradecylphosphonium bromide, tetrabutylphosphonium bromide, tetraoctylphosphonium bromide, trihexyltetradecylphosphonium chloride, tributyltetradecylphosphonium chloride, tributylmethylphosphonium methylcarbonate, trioctylmethylphosphonium methylcarbonate, trihexyltetradecylphosphonium decanoate, trihexyltetradecylphosphonium bis(2,4,4-trimethylpentyl)phosphinate, trihexyltetradecylphosphonium dicyanamide, triisobutylmethylphosphonium tosylate, trihexyltetradecylphosphonium hexafluorophosphate, tributylmethylphosphonium methyl sulfate, tetrabutylphosphonium chloride, ethyltributylphosphonium diethyl phosphate, tributyltetradecylphosphonium dodecylbenzenesulfonate, trihexyltetradecylphosphonium bis(trifluoromethylsulfonyl)imide, tributylmethylphosphonium 1,1,2,2-tetrafluoroethanesulfonate, triethylsulfonium bis(trifluoromethylsulfonyl)imide, diethylmethylsulfonium bis(trifluoromethylsulfonyl)imide, triethylsulfonium iodide, and trimethylsulfonium iodide.

In the sodium secondary battery according to the exemplary embodiment of the present invention, the solvent of the cathode solution may further contain a heterogeneous solvent having miscibility with the above-mentioned solvent. As an example of the heterogeneous solvent, there is at least one solvent selected from a group consisting of ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropylcarbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, σ-valerolactone, γ-caprolactone, ε-caprolactone, β-propiolactone, tetrahydrofuran, 2-methyl tetrahydrofuran, 3-methyltetrahydrofuran, trimethyl phosphate, triethyl phosphate, tris(2-chlorodethyl)phosphate, tris (2,2,2-trifluoroethyl)phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, and 2-ethylsulfolane.

In the sodium secondary battery according to the exemplary embodiment of the present invention, the anode may contain an anode active material containing sodium, wherein the anode active material may contain a sodium metal or a sodium alloy. As a non-restrictive example, the sodium alloy may be an alloy of sodium and cesium, an alloy of sodium and rubidium, or a mixture thereof. The anode active material may be a solid-state material or a liquid-state material including a molten state material at the operation temperature of the battery. Here, in order to allow the battery to have capacity of 50 Wh/kg or more, the anode active material may be molten sodium (Na), and the operation temperature of the battery may be 98 to 200° C., substantially 98 to 150° C., and more substantially 98 to 130° C.

In the sodium secondary battery according to the exemplary embodiment of the present invention, as the sodium ion conductive solid electrolyte provided between the cathode and the anode, any material may be used as long as the material may physically separate the cathode and the anode from each other and have selective conductivity for the sodium ion. Therefore, a solid electrolyte generally used for selective conduction of the sodium ion in a battery field may be used. As a non-restrictive example, the solid electrolyte may be Na super ionic conductor (NASICON), β-alumina, or β"-alumina. As a non-restrictive example, the NASICON may include Na—Zr—Si—O based complex oxide, Na—Zr—Si—P—O based complex oxide, Y-doped Na—Zr—Si—P—O based complex oxide, Fe-doped Na—Zr—Si—P—O based complex oxide, or a mixture thereof. In detail, the NASICON may include $Na_3Zr_2Si_2PO_{12}$, $Na_{1+x}Si_xZr_2P_{3-x}O_{12}$ (x is a real number satisfying the following Inequality: $1.6 < x < 2.4$), Y- or Fe-doped $Na_3Zr_2Si_2PO_{12}$, Y- or Fe-doped $Na_{1+x}Si_xZr_2P_{3-x}O_{12}$ (x is a real number satisfying the following Inequality: $1.6 < x < 2.4$), or a mixture thereof.

The sodium secondary battery according to the exemplary embodiment of the present invention may have a plate type battery structure including a plate shaped solid electrolyte or a tube type battery structure including a tube shaped solid electrolyte of which one end is closed, based on a shape of the solid electrolyte separating the anode and the cathode to partition off an anode space from a cathode space.

In the sodium secondary battery according to the exemplary embodiment of the present invention, the cathode solution may contain at least one plating additive selected from a suppressor, a leveler, and an accelerator.

That is, in the sodium secondary battery according to the exemplary embodiment of the present invention, the cathode solution may further contain at least one plating additive selected from the suppressor, the leveler, and the accelerator.

More specifically, the plating additive contained in the cathode solution may include a plating additive used to form a metal film on a plating target through an electro plating or electroless plating process in a general plating field, and the suppressor, the leveler, and the accelerator (brightener) may be a suppressor, a leveler, and an accelerator that are known to be used in a plating bath for plating in the plating field.

In the sodium secondary battery according to the exemplary embodiment of the present invention, the accelerator may have a relatively small size as compared with the suppressor and be mainly distributed in a narrow space such as a pore, or the like, to serve to facilitate a process of reducing metal ions to metal, that is, movement of electric charges in a discharge process of the battery, and reduce sizes of metal particles, thereby making it possible to activate electroplating of the metal in an internal space. The suppressor may serve to hinder reduction of the metal ion by surface adsorption, that is, to be adsorbed on a surface of a current collector to decrease an electroplating rate at the surface at which the electroplating of the metal may be easily performed, or the like, thereby making it possible to allow the electroplating of the metal to be more uniformly performed. The leveler may perform a role similar to that of the suppressor but serve to reduce surface roughness, that is, reduce surface roughness of a metal (film) reduced (electroplated) on a surface of the cathode current collector in addition to allowing the electroplating of the metal to be continuously performed in an internal space by being adsorbed at an edge of a pore mouth to block the mouth from being closed.

In the sodium secondary battery according to the exemplary embodiment of the present invention, the accelerator may be an organic compound containing sulfur. In detail, the accelerator may be a sulfur-containing organic compound having a molecular weight of 1000 g/mol or less, more specifically, 10 to 1000 g/mol and containing at least one sulfur atom. In this case, the sulfur-containing organic compound may not contain nitrogen.

More specifically, the sulfur-containing organic compound may be an organic compound having a sulfide group and/or a sulfonic acid group and may be a material represented by the following General Formula: R'—S—R—$SO_3$—X. In the General Formula, R is optionally substituted alkyl, optionally substituted heteroalkyl (including cycloalkyl), optionally substituted aryl, or optionally substituted heteroalicyclic, X is a counter ion, for example, sodium or potassium, and R' is hydrogen or a chemical bond (that is, —S—R—$SO_3$). In this case, the alkyl group may be C1-C16, specifically C1-C12, more specifically C1-C8. The heteroalkyl group may have at least one hetero atom (N, O, or S) in a chain and be C1-C16, specifically C1-C12, and more specifically C1-C8. The aryl group may be a carbocyclic aryl group, for example, phenyl or naphthyl. The hetero aromatic group may also be included in the aryl group and include: 1 to 3 N, O, or S atoms; and 1 to 3 separated or fused rings. An example of the hetero aromatic group may include coumarinyl, quinolinyl, pyridyl, pyrazinyl, pyrimidyl, furyl, pyrrolyl, thienyl, thiazolyl, oxazolyl, oxadiazolyl, triazol, imidazolyl, indolyl, benzofuranyl, benzothiazol, and the like. The heteroalicyclic group may have 1 to 3 N, O or S atoms and 1 to 3 separate or fused rings. An example of the heteroalicyclic group may include tetrahydrofuranyl, thienyl, tetrahydropyranyl, piperdinyl, morpholino, pyrrolindinyl, and the like. The term "optionally substituted" means "substituted" or "unsubstituted" and substituted substituents may each independently include C1-C8 alkoxy; C1-C8 alkyl; at least one halogen atom selected from F, Cl, and Br; cyano; nitro, and the like.

More specifically, the accelerator may be one or at least two selected from compounds represented by the following General Formulas: $HO_3$—S—$R_1$—SH, $HO_3$S—$R_1$—S—S—$R_1$—$SO_3$H, and $HO_3$S—$R_2$—S—S—$R_2$—$SO_3$H. Where, $R_1$(s) may be each independently an optionally substituted alkyl group, specifically, C1-C6 alkyl group, and more specifically, C1-C4 alkyl group. $R_2$ may be an optionally substituted aryl group, specifically, optionally substituted phenyl or naphthyl. "Optionally substituted" in $R_1$ and $R_2$ means "substituted" or "unsubstituted" and substituted substituents may be C1-C8 alkoxy, C1-C8 alkyl, and at least one halogen atom selected from F, Cl, and Br.

In the sodium secondary battery according to the exemplary embodiment of the present invention, the accelerator may be at least one material selected from a group consisting of N,N-dimethyl-dithiocarbamic acid-(3-sulfopropyl)ester, N,N-dimethyl-dithiocarbamic acid-(3-sulfoethyl)ester, 3-N, N-dimethylaminodithiocarbamoyl-1-propanesulfonic acid sodium salt, 3-mercapto-propylsulfonic acid-(3-sulfopropyl)ester, 3-mercapto-propylsulfonic acid sodium salt (3-mercaptopropane-1-sulfonic acid sodium salt), O-ethyldithiocarbonic acid-S-(ω-sulfopropyl)-ester, potassium salt thioglycolic acid, bissulfopropyl disulfide, 3-(benzothiazolyl-s-thio)propyl sulfonic acid sodium salt, pyridinium propyl sulfobetaine, 1-sodium-3-mercaptopropane-1-sulfonate, 3-mercapto-ethyl propylsulfonic acid-(3-sulfoethyl) ester, 3-mercapto-ethylsulfonic acid sodium salt, 3-(benzothiazolyl-s-thio)ethyl sulfonic acid sodium salt, pyridinium ethyl sulfobetaine, 1-sodium-3-mercaptoethane-1sulfonate, bis-sulfoethyl disulfide, bis-(3-sulfopropyl)disulfide disodium salt, ethylenedithiodipropylsulfonic acid sodium salt, bis-(p-sulfophenyl)-disulfide disodium salt, bis-(ω-sulfobutyl)-disulfide disodium salt, bis-(ω-sulfohydroxypropyl)-disulfide disodium salt, bis-(ω-sulfopropyl)-disulfide disodium salt, bis-(ω-sulfopropyl)-sulfide disodium salt, methyl-(ω-sulfopropyl)-disulfide sodium salt, methyl-(ω-sulfopropyl)-trisulfide disodium salt, thiophosphoric acid-O-ethyl-bis-(ω-sulfopropyl)-ester disodium salt, thiophhosphoric acid-tri(ω-sulfopropyl)-ester trisodium salt, N,N-dimethyldithiocarbamic acid-(3-sulfopropyl)ester sodium salt, (O-ethyldithiocarbonate)-S-(3-sulfopropyl)ester potassium salt, 3-[(aminoiminomethyl)-thio]-1-propanesulfonic acid, and 3-(2-benzothiazolylthio)-1-propane sulfonic acid sodium salt.

In the sodium secondary battery according to the exemplary embodiment of the present invention, the suppressor may be an oxygen containing polymer compound having a weight average molecular weight (Mw) of 1000 to 20000 g/mol.

More specifically, the suppressor may be a polymer represented by the following General Formula: $R_3$—O—(CZYCZ'Y'O)$_n$$R_3$'. Where, $R_3$ and $R_3$' may be each independently H, a C2-C20 alkyl group, or a C6-C10 aryl group, Z, Y, Z' and Y' may be each independently hydrogen, alkyl, aryl, or aralkyl, alkyl of Z, Y, Z' or Y' may be methyl, ethyl, or propyl, aryl of Z, Y, Z' or Y' may be phenyl, aralkyl of Z, Y, Z' or Y' may be benzyl, and n is an integer of 3 to 20,000.

In the sodium secondary battery according to the exemplary embodiment of the present invention, the suppressor may be a hetero aromatic organic compound. In detail, the suppressor may be an aromatic organic compound having a 6-membered aromatic ring selected from a group consisting of a benzene, pyridine, pyrazine, benzoquinone, and melamine rings and at least two hetero atoms selected from a group consisting of a nitrogen atom, an oxygen atom, and a sulfur atom that are present in the aromatic ring or conjugated with the aromatic ring.

In the sodium secondary battery according to the exemplary embodiment of the present invention, the suppressor may be at least one selected from a group consisting of carboxymethylcellulose, nonylphenol polyglycol ether, octanediol bis-(polyalkylene glycol ether), octanolpolyalkyleneglycol ether, polyethyleneglycol ether, oleic acid polyglycol ester, polyethylenepropylene glycol, polyethylene glycol, polyethylene glycoldimethylether, polyoxypropylene glycol, polypropylene glycol, polyvinylalcohol, stearic acid polyglycol ester, stearyl alcohol polyglycol ether, β-naphthol-polyethylene glycol ether, polyethylene oxide, an ethylene oxide-propylene oxide copolymer, a butyl alcohol-ethylene oxide-propylene oxide copolymer, benzotriazole, sodium benzoate, and derivatives thereof.

In the sodium secondary battery according to the exemplary embodiment of the present invention, the leveler may be polyimine, organic sulfonate, a tertiary amine compound, a quaternary amine compound, C4-C35 alkyl ammonium chloride, a phenazine based dye, a phenazine azo dye, or a mixture thereof. In this case, the phenazine based dye may include safranine, and the phenazine azo dye may include Janus Green B type.

In the sodium secondary battery according to the exemplary embodiment of the present invention, polyimine may be alkylpolyimine or arylated polyethylene imine (PEI). In detail, the arylated PEI may be a material represented by the following General Formula: $R_4—R_5N—R_6SO_3^-$. In this case, $R_4$ is C1-C4 alkyl, aromatic hydrocarbon, sulfonyl, phosphonyl, aldehyde, or carbamide, $R_5$ is pyridine, $R_6$ is C1-C4 alkyl, cycloalkyl, aromatic hydrocarbon, or C1-C4 alkyl in which hydrogen bonded to $R_6$ is substituted by any one substituent selected from methyl, ethyl, propyl, isopropyl, n-butyl, sec-butyl, and tert-butyl, substituted cycloalkyl, or substituted aromatic hydrocarbon.

In the sodium secondary battery according to the exemplary embodiment of the present invention, examples of the tertiary amine compound may include imidazole based compounds, aliphatic amine compounds, or a mixture thereof, and the quaternary amine compound may be a reaction product between the tertiary amine compound and alkyl halide. More specifically, the imidazole based compound may be at least one selected from imidazole, 1-methylimidazole, 1-ethylimidazole, 2-methylimidazole, 1-ethyl-2-methylimidazole, and 1-oxymethylimidazole. The aliphatic amine compound may be at least one selected from monoethanolamine, diethanolamine, triethanolamine, dimethylamine, ethylenediamine, diethylenetriamine, aminobispropylamine, triethylenetetramine, tetraethylenepentamine, and N,N-bis-(3-aminopropyl)ethylenediamine. An example of the alkyl halide reacted with the tertiary amine compound may include monochloroacetate, benzyl chloride, chloroacetateamide, 3-aminobenzyl chloride, aryl chloride, dichloroethane, monochloropropane, dichloroglycerin, ethylene chlorohydrine, and epichlorohydrine.

In the sodium secondary battery according to the exemplary embodiment of the present invention, the leveler may be C4-C35 alkyl ammonium chloride, more specifically, aliphatic linear trimethyl ammonium chloride having a chain length of C8-C18.

In the sodium secondary battery according to the exemplary embodiment of the present invention, the leveler may be at least one selected from a group consisting of 1-(2-hydroxyethyl)-2-imidazolidinethione (HIT), 4-mercaptopyridine, 2-mercaptothiazoline, ethylene thiourea, thiourea, thiadiazole, imidazole, 1-methylimidazole, 2-methylimidazole, 2-phenylimidazole, 1,2-dimethylimidazole, 2,4-dimethylimidazole, 1-ethylimidazole, 1-ethyl-2-methylimidazole, 1-oxymethylimidazole, 1-vinylimidazole, monoethanolamine, diethanolamine, triethanolamine, dimethylamine, ethylenediamine, diethylenetriamine, iminobispropylamine, triethylenetetramine, tetraethylenepentamine, N, N-bis-(3-aminopropyl)ethylenediamine, acetamide, propylamide, benzamide, acrylamide, methacrylamide, N,N-dimethylacrylamide, N,N-diethylmethacrylamide, N,N-diethylacrylamide, N,N-dimethylmethacrylamide, N-(hydroxymethyl)acrylamide, polyacrylic acid amide, hydrolysates of polyacrylic acid amide, poly(phenylene terephthalamide), thioflavine, safranine, Janus Green B type, polyethyleneimine (PEI), polyoxyethyleneamine, polyvinylpyrrolidone, arylated polyethyleneimine (PEI), sulfopropylated polyethyleneimine (PEI), lauryl dimethyl betaine, lauramidopropyl betaine, 1-(3-sulfopropyl)pyridinium betaine (PPS), 3-formyl-1-(3-sulfopropyl)pyridinium betaine (FPPS), isoquinoline 1-propanesulfonic acid (IQPS), 3-pyridinesulfonic acid (PYSA), nicotinamide N-propylsulfonate (NPS), undecyltrimethylammonium chloride, dodecyltrimethylammonium chloride, tridecyltrimethylammonium chloride, cetyltrimethylammonium chloride, (3-chloro-2-hydroxypropyl)trimethylammonium chloride, and octyltrimethylammonium chloride.

In the sodium secondary battery according to the exemplary embodiment of the present invention, when the leveler is a polymer (macromolecule), a weight average molecular weight thereof may be 10,000 to 200,000, specifically, 10,000 to 160,000, and more specifically, 10,000 to 70,000.

As described above, the sodium secondary battery according to the embodiment of the present invention contains at least one plating additive selected from the above-mentioned accelerator, suppressor, and leveler, such that electroplating of the cathode active metal may be densely and uniformly performed in the open pore channel of the insulator, directionally performed in the length direction of the channel, and more rapid and selectively performed along the channel from the conductive substrate exposed by the open pore channel. In addition, at the time of ionization (oxidation, dissolution in the cathode solution) of the electroplated cathode active metal, the cathode active metal in the open pore channel may be ionized while forming a flat plate (cathode active metal/cathode solution interface) and be uniformly and rapidly ionized.

That is, as the insulator formed with the open pore channel is laminated on the conductive substrate, in the case in which the metal electroplated in the channel is not dense and uniform, internal resistance of the battery may be significantly increased. The above-mentioned plating additive may improve uniformity, flatness, and specific resistance of the electroplated cathode active metal when the cathode active metal is electroplated or ionized in the open pore channel, and prevent the internal resistance of the battery from being increased.

In the sodium secondary battery according to the exemplary embodiment of the present invention, the cathode solution may contain the plating additive at a content of 1.5 μM to 150 mM, specifically, 50 μM to 50 mM, and more specifically, 0.5 mM to 30 mM. In the case in which the content of the plating additive in the cathode solution is more than 150 mM, conductivity of the sodium ion in the cathode solution may be decreased by the plating additive, such that efficiency of the battery may be decreased. In the case in which the content of the plating additive in the cathode solution is less than 1.5 μM, effects of improving uniformity and flatness and preventing the specific resistance from being decreased by the plating additive at the time of charging and discharging the battery as described above may be insignificant.

In the sodium secondary battery according to the exemplary embodiment of the present invention, the cathode solution contains the suppressor and the accelerator, wherein a molar ratio of the accelerator to the suppressor may be 1:0.2 to 2. The molar ratio of the accelerator to the suppressor may affect the electroplating rate, electroplating uniformity, and electroplating compactness of the cathode active metal. In the case in which the molar ratio of the suppressor to the accelerator is less than 0.2, the electroplating of the cathode active metal may be excessively performed at a region of the current collector at which adsorption of the suppressor is insignificant, and in the case in which the suppressor to the accelerator is more than 2, the electroplating rate of the cathode active metal may be excessively decreased by the suppressor, the charge and discharge reaction of the battery may not be smoothly carried out.

In the sodium secondary battery according to the exemplary embodiment of the present invention, the cathode solution may further contain the leveler in addition to the suppressor and the accelerator, wherein a molar ratio of the accelerator to the leveler may be 1:0.1 to 2. The leveler performs a role similar to that of the suppressor but serves to allow the electroplating of the metal to be well performed in the internal space by being mainly adsorbed at the edge of the pore mouth to block the mouth from being closed. In the case in which the molar ratio of the leveler to the accelerator is less than 0.1, the cathode active metal is firstly electroplated on the mouth (surface opening part) rather than an internal portion of a narrow space such as the pores, or the like, which may close the mouth first, such that it may be difficult to continuously perform electroplating in the internal portion, and in the case in which the molar ratio of the leveler to the accelerator is more than 2, the electroplating rate of the cathode active metal may be excessively decreased by the leveler, such that the charge and discharge reaction of the battery may not be smoothly carried out.

In the sodium secondary battery according to the exemplary embodiment of the present invention, when the cathode solution contains the cathode active metal halide at a concentration of 0.1 to 10M, the cathode solution may contain the plating additive at a concentration of 1.5 μM to 150 mM. In this case, the molar ratio of the accelerator to the suppressor may be 1:0.2 to 2, and the molar ratio of the accelerator to the leveler may be 1:0.1 to 2.

Figure 5:
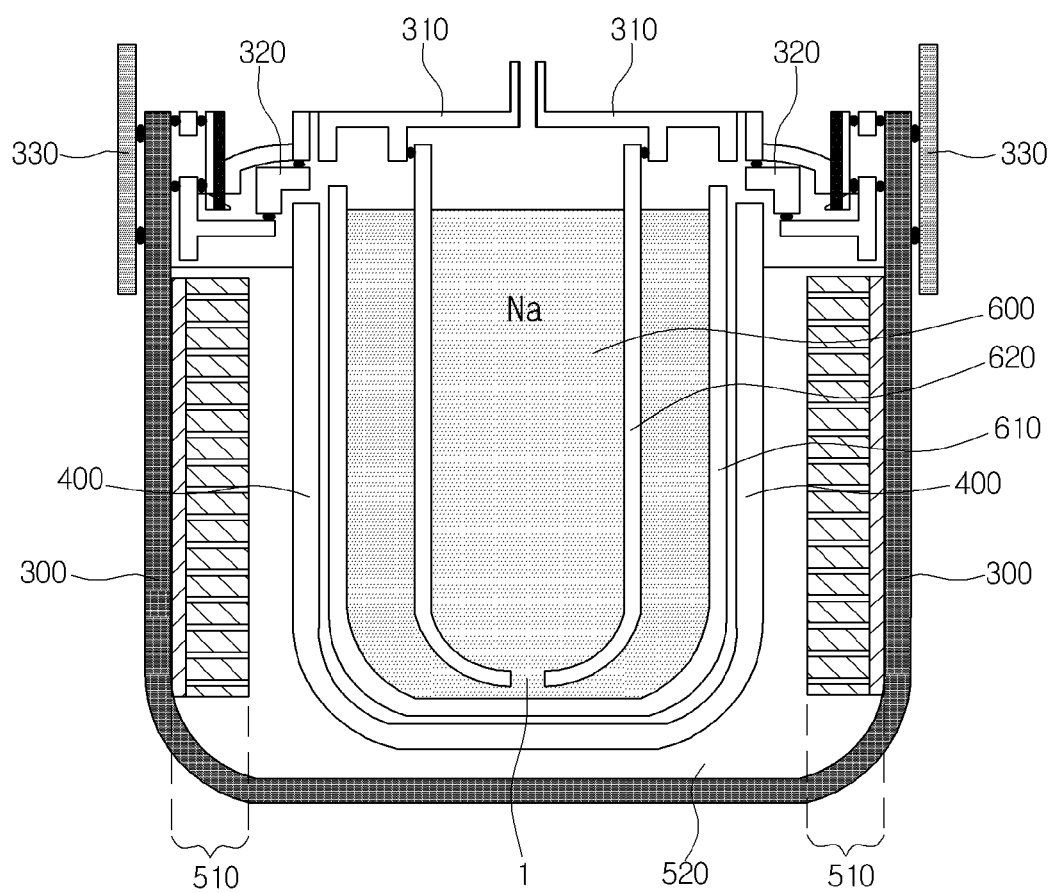
FIG. 5 is a cross-sectional view showing a structure of a sodium secondary battery according to another exemplary embodiment of the present invention.

FIG. 5 is a cross-sectional view showing a structure of a sodium secondary battery according to another exemplary embodiment of the present invention, based on the case in which an anode active material is molten sodium. FIG. 5 shows an example of the tube type sodium secondary battery, but the present invention is not limited to a physical shape of the battery. That is, the sodium secondary battery according to the present invention may have a structure of a general sodium based secondary battery such as the plate type battery structure or a tube type battery structure to be described below.

FIG. 5 shows an example of the structure of the sodium secondary battery according to the exemplary embodiment of the present invention. As shown in FIG. 5, the sodium secondary battery according to the exemplary embodiment of the present invention may include a cylindrical metal housing 300 having a closed lower end and an open upper end, a sodium ion conductive solid electrolyte (hereinafter, solid electrolyte tube 400) sequentially positioned in the metal housing 300 from an outer side of the metal housing 300 to an inner side thereof and having a closed lower end in a tube shape, a safety tube 610, and a wicking tube 620.

More specifically, the wicking tube 620 positioned at the innermost portion, that is, the center of the metal housing 300, may have a tube shape in which a through-hole 1 is formed at a lower end thereof, and the safety tube 610 may be positioned at an outer side of the wicking tube 620 and have a structure in which the safety tube 610 encloses the wicking tube 620 while being spaced apart from the wicking tube 620 by a predetermined distance.

An anode 600 including molten sodium is provided in the wicking tube 620 and has a structure in which it fills an empty space between the wicking tube 620 and the safety tube 610 through the through-hole 1 formed at the lower portion of the wicking tube 620.

A dual structure of the wicking tube 620 and the safety tube 610 is a structure in which a violent reaction between cathode materials and anode materials may be prevented at the time of damage of the solid electrolyte tube 400 and a level of the molten sodium may be constantly maintained by capillary force even at the time of discharge.

The solid electrolyte tube 400 is positioned at the outer side of the safety tube 610 so as to enclose the safety tube 610 and may be the tube shaped solid electrolyte having selective permeability to the sodium ion ($Na^+$).

A cathode solution 520 and a cathode current collector 510 may be provided in a space between the solid electrolyte tube 400 enclosing the safety tube 610 and the metal housing 300.

That is, the sodium secondary battery according to the exemplary embodiment of the present invention may have a concentric structure in which the wicking tube 620, the safety tube 610, the solid electrolyte tube 400, and the metal housing 300 are sequentially disposed from the inner side to the outer side. Here, the anode 600 containing the molten sodium may be filled in the wicking tube 620, the cathode solution 520 containing the plating additive may be provided in the space between the solid electrolyte tube 400 and the metal housing 300, and the cathode current collector 510 may be provided so as to be immersed into the cathode solution 520.

As shown in FIG. 5, based on the charge state, the cathode solution 520 and the cathode current collector 510 may be positioned in the cathode space, and based on the discharge state, the cathode solution 520 and the cathode current collector 510 including the cathode active metal electroplated in the open pore channel 210 of the insulator 200 may be positioned in the cathode space.

In addition, the sodium battery according to the exemplary embodiment of the present invention may further include a cover 310 positioned on the metal housing 300 to close an inner portion of the metal housing, an insulator 320 having a ring shape and positioned at an upper side of the metal housing 300 to electrically insulate between the metal housing 300 and the solid electrolyte tube 400, and an electrode terminal 330 positioned at a circumference of an upper end of the metal housing 300. Further, in order to minimize evaporation of liquid-state components, internal pressure of the battery closed by the cover 310 immediately after manufacturing the battery may be 15 psi or more, and the cathode current collector 510, more specifically, the conductive substrate 100 of the cathode current collector 510 may be electrically connected to the metal housing 300. Furthermore, a general anode current collector may be input through a through-hole of the cover 310 so as to be immersed into the anode active material including the molten sodium filled in the wicking tube 620 at a predetermined region.

The current collector for a secondary battery according to the present invention may prevent capacity of the battery from being decreased due to permanent separation of the active materials from the current collector when charge and discharge cycles are repeatedly performed by limiting the battery reaction region at which charge and discharge reactions of the battery are carried out. In addition, the secondary battery including the current collector according to the present invention is configured to include the anode containing sodium, the solid electrolyte having selective conductivity for sodium ions, and the cathode solution containing the solvent dissolving the cathode active metal halide and sodium halide, such that the battery may operate at a low temperature in a range of room temperature to 200° C., and electrochemical reactions of the battery are carried out by the cathode active metal halide and the sodium halide dissolved in the cathode solution, such that capacity of the battery may be significantly increased, and the active region at which the electrochemical reactions are carried out may be increased, thereby making it possible to significantly increase the charge/discharge rate of the battery and prevent internal resistance of the battery from being increased. Further, the secondary battery including the current collector according to the present invention contains at least one plating additive selected from the accelerator, the suppressor, and the leveler, such that electroplating of a metal may be uniformly performed even though a current collector physically uneven due to an open pore channel is provided, and a metal film (electroplating film) composed of compact and fine particles is formed, such that specific resistance may be excellent and electroplating rate may be improved, thereby making it possible to rapidly charge and discharge the battery. In addition, electroplating and ionization of the metal may be performed while maintaining a flat metal film.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A sodium secondary battery comprising:
   an anode containing sodium;
   a cathode solution;
   a sodium ion conductive solid electrolyte separating the anode and the cathode solution from each other; and
   a cathode current collector immersed into the cathode solution and spaced apart from the sodium ion conductive solid electrolyte,
   wherein the cathode current collector comprises: a conductive substrate and an insulator laminated on a surface of the conductive substrate;
   wherein the insulator is formed of a polymer and formed with a plurality of open pore channels penetrating through the insulator, the cathode solution is filled inside the open pore channels, and a portion of the surface of the conductive substrate is exposed to and directly contacts with the cathode solution by the open pore channels, and
   wherein the cathode solution contains: a metal halide, which is a halide of at least one metal selected from the group consisting of transition metals and Groups 12 to 14 metals; and a solvent dissolving the metal halide.

2. The sodium secondary battery of claim 1, wherein the cathode solution further contains a sodium halide dissolved by the solvent.

3. The sodium secondary battery of claim 2, wherein a charge reaction of the sodium secondary battery is carried out according to the following Reaction Formula 1, and a discharge reaction of the sodium secondary battery is carried out according to the following Reaction Formula 2, $$mNaX+M \rightarrow mNa+MX_m \qquad \text{(Reaction formula 1)}$$

$$mNa+MX_m \rightarrow mNaX+M \qquad \text{(Reaction formula 2)}$$

(where M is the at least one metal, X is a halogen atom, and m is a natural number of 1 to 4, $MX_m$, is the metal halide and NaX is the sodium halide).

4. The sodium secondary battery of claim 1, wherein the cathode solution further contains at least one plating additive selected from the group consisting of a suppressor, a leveler, and an accelerator.

5. The sodium secondary battery of claim 4, wherein the accelerator is a sulfur-containing organic compound, the suppressor is an oxygen-containing polymer compound having a weight average molecular weight (Mw) of 1000 to 20000 g/mol, and the leveler is a nitrogen-containing organic material.

6. The sodium secondary battery of claim 1, wherein the portion of the surface of the conductive substrate $A_p$ satisfies the following Correlation Equation 1, $$0.05A_s \leq A_p \leq 0.8A_s \qquad \text{(Correlation Equation 1)}$$

(where $A_s$ is a total area of the surface on which the insulator is laminated).

7. The sodium secondary battery of claim 1, wherein the open pore channels are arrayed to be spaced apart from one another.

8. The sodium secondary battery of claim 7, wherein each of the open pore channels has a cross-sectional area of 0.01 to 80 mm².

9. The sodium secondary battery of claim 1, wherein the conductive substrate includes a plate shaped conductive substrate, and the insulator is laminated on a surface of the plate shaped conductive substrate.

10. The sodium secondary battery of claim 1, wherein the insulator includes a hollow cylindrical shaped insulator, and the conductive substrate encloses an outer surface or an inner surface of the hollow cylindrical shaped insulator.

11. The sodium secondary battery of claim 1, further comprising: a cylindrical metal housing containing the anode and the cathode solution,
   wherein the conductive substrate is electrically connected to the metal housing.

12. The sodium secondary battery of claim 1, wherein the sodium secondary battery is configured to have an operation temperature of 98° C. to 150° C.

* * * * *